(12) United States Patent
Khare

(10) Patent No.: US 9,930,389 B2
(45) Date of Patent: Mar. 27, 2018

(54) SYSTEM AND METHOD FOR DISPLAYING ADVERTISEMENTS

(71) Applicant: SUREWAVES MEDIATECH PRIVATE LIMITED, Bangalore (IN)

(72) Inventor: Rajendra Kumar Khare, Bangalore (IN)

(73) Assignee: SUREWAVES MEDIATECH PRIVATE LIMITED, Karnataka (IN)

(*) Notice: Subject to any disclaimer, the term of this patent is extended or adjusted under 35 U.S.C. 154(b) by 0 days.

(21) Appl. No.: 14/631,866

(22) Filed: Feb. 26, 2015

(65) Prior Publication Data
US 2015/0249853 A1 Sep. 3, 2015

(30) Foreign Application Priority Data

Feb. 28, 2014 (IN) .............................. 353/CHE/2014

(51) Int. Cl.
| H04N 21/262 | (2011.01) |
| H04N 21/2668 | (2011.01) |
| H04N 21/2385 | (2011.01) |
| H04N 21/234 | (2011.01) |
| H04N 21/81 | (2011.01) |
| H04N 21/845 | (2011.01) |
| H04N 21/443 | (2011.01) |

(Continued)

(52) U.S. Cl.
CPC ... *H04N 21/26283* (2013.01); *H04N 21/2385* (2013.01); *H04N 21/23424* (2013.01); *H04N 21/2668* (2013.01); *H04N 21/4384* (2013.01); *H04N 21/442* (2013.01); *H04N 21/4432* (2013.01); *H04N 21/812* (2013.01); *H04N 21/8456* (2013.01)

(58) Field of Classification Search
CPC ........... H04N 21/26283; H04N 21/812; H04N 21/4331; H04N 21/435; H04N 21/235; H04N 21/23424; H04N 21/4432; H04N 21/2385; G06Q 30/02
See application file for complete search history.

(56) References Cited

U.S. PATENT DOCUMENTS

| 5,233,423 | A * | 8/1993 | Jernigan ........... H04N 21/42653 348/564 |
| 7,587,729 | B2 * | 9/2009 | de Heer ............... H04N 21/235 725/22 |

(Continued)

*Primary Examiner* — Hai V Tran
(74) *Attorney, Agent, or Firm* — Barry Choobin; Patent 360 LLC

(57) ABSTRACT

A system for customizing display of a plurality of advertisements on a display terminal through a television distribution network comprises a scheduling module, a media grid in communication with the scheduling module, a head-end in communication with the media grid, and a set-top box in communication with the head-end. The scheduling module schedules a plurality of time slots for airing the advertisements on a default power-up channel. The media grid stores scheduling information of the advertisements which are to be aired at the respective time slots allocated by the scheduling module. The head-end broadcasts the advertisements scheduled for a particular time slot onto a default power-up channel. The set-top box displays the default channel on the display device during a power-up of the set-top box.

11 Claims, 4 Drawing Sheets

(51) Int. Cl.
*H04N 21/438* (2011.01)
*H04N 21/442* (2011.01)

(56) References Cited

U.S. PATENT DOCUMENTS

| | | | | |
|---|---|---|---|---|
| 7,703,114 | B2* | 4/2010 | Thukral | G06Q 30/02 |
| | | | | 725/110 |
| 9,628,838 | B2* | 4/2017 | Kummer | H04N 21/2668 |
| 2004/0116070 | A1* | 6/2004 | Fishman | H04H 20/106 |
| | | | | 455/3.02 |
| 2004/0194131 | A1* | 9/2004 | Ellis | H04N 21/26241 |
| | | | | 725/34 |
| 2005/0188402 | A1* | 8/2005 | de Andrade | H04N 5/44543 |
| | | | | 725/46 |
| 2008/0250445 | A1* | 10/2008 | Zigmond | G06Q 30/02 |
| | | | | 725/32 |
| 2014/0026153 | A1* | 1/2014 | Sorlander | G06Q 30/02 |
| | | | | 725/5 |
| 2014/0082659 | A1* | 3/2014 | Fife | H04N 21/25891 |
| | | | | 725/32 |

* cited by examiner

SYSTEM AND METHOD FOR DISPLAYING ADVERTISEMENTS

CROSS REFERENCE TO RELATED APPLICATION

The embodiments herein claims the priority of the Indian Provisional Patent Application (PPA) with serial number 353/CHE/2014 filed on Jan. 28, 2014 with the title, "Method and System for Customizing Power Up Advertisements in Cable or Satellite Television" and subsequently post-dated to Feb. 28, 2014 and the contents of which by reference in its entirely.

BACKGROUND

Technical Field

The embodiments herein generally relates to field of advertising and particularly relates to the field of advertising for a television system. The embodiments herein more particularly relates to a method and system for displaying advertisements during power-up of the television system.

Description of the Related Art

Television reception systems are typically designed to function in one of two ways: when the receiver is turned on for viewing programs, the receiver remains on the same channel that was being viewed when it was turned off; else the receiver always re-tunes to the same default channel when it is turned on. This power-up configuration of the receiver is observed in a stand-alone television device as well as in the television broadcast/distribution system with other tuning/reception devices (e.g., set-top boxes) which use a variety of delivery methods, including, for example, cable, satellite, and line-of-sight. Even though the first power-up configuration of the receiver is ideal for a television viewer, the configuration represents loss of revenue and promotional opportunities for the television service providers. That is, by receivers automatically tuning to the same channel that was viewed before turning off the receiver, the channel which is of viewer's choice, the service provider does not have the opportunity to more directly draw subscribers' attention towards the advertisements that form one of the means for generating revenue.

In the view of forgoing, there is a need for a system and method provided for displaying advertisements on the television system, when the television receiver is turned on. Thus, there is a need for a system which allows the advertisers to display a targeted advertising campaign to the television viewers, when the receiver is turned on, thus allowing the advertisers to reach more appropriate audience with their advertisements.

Furthermore, with the ever increasing number of consumer choices for television viewing, it is important for advertisers, content producers, and service providers such as cable television and satellite DTH television companies to accurately measure audience viewership. Traditional methods of measuring television viewership do not accurately measure lightly viewed channels.

In view of the foregoing, there is a need for a method and system for accurately measuring an audience viewership for the advertisements being displayed on the television system, when the television receiver is turned on.

The abovementioned shortcomings, disadvantages and problems are addressed herein and which will be understood by reading and studying the following specification.

OBJECTIVES OF THE EMBODIMENTS

The primary object of the embodiments herein is to provide a method and system for customizing a plurality of advertisements or television commercials that are to be displayed during a power up of a set-top box in a cable or satellite DTH television.

Another object of the embodiments herein is to provide a default or preset power-up channel for displaying the advertisements or television commercials on the cable or satellite DTH television.

Yet another object of the embodiments herein is to provide a real time system for scheduling the advertisements that are to be displayed on the cable or satellite DTH television network.

Yet another object of the embodiments herein is to provide a method and system for customizing a plurality of power-up channels in the cable or satellite DTH television for combined monetization of advertisements.

Yet another object of the embodiments herein is to provide a method and system for measuring and verifying the viewership of the advertisements displayed during power up of the set-top box in the cable or satellite DTH television.

Yet another object of the embodiments herein is to provide a method and system for detecting unsold time slots in commercials to broadcast a preset channel selected by a multi-service operator (MSO) or service provider.

These and other objects and advantages of the embodiments herein will become readily apparent from the following detailed description taken in conjunction with the accompanying drawings.

SUMMARY

The various embodiments herein provide a system for customizing display of a plurality of advertisements on a display terminal through a television distribution network. The system comprises a scheduling module, a media grid in communication with the scheduling module, a head-end in communication with the media grid, and a set-top box in communication with the head-end. The scheduling module is configured to schedule a plurality of time slots for airing the advertisements on a default power-up channel. The media grid is configured to store scheduling information of the advertisements which are to be aired at the respective time slots allocated by the scheduling module. The head-end is configured to broadcast the advertisements scheduled for a particular time slot onto a default power-up channel. The set-top box is configured to display the default channel on the display device during a power-up of the set-top box. An internet connectivity is provided for enabling communication between the media grid and the media station. The advertisement content from the head-end to the plurality of display terminals via a set-top box is communicated through a wired or wireless communication means.

According to one embodiment herein, the time-slots for displaying the advertisements are pre-programmed by the scheduling module.

According to one embodiment herein, the scheduling module provides a centralized scheduling of the advertisements for a plurality of media stations communicating with the scheduling module.

According to one embodiment herein, the broadcasters are allowed to choose the empty time slots allocated by the scheduling module for broadcasting the respective channel during the power up of the set-top box.

According to one embodiment herein, the default power-up channel plays the scheduled advertisements in a continuous loop during the entire time slot.

According to one embodiment herein, the head-end further comprises a media station with a playout module and a Radio Frequency (RF) modulator.

According to one embodiment herein, the media station is configured to transmit a plurality of television channels from a broadcaster to the set-top box. The playout module is further configured to transmit the advertisements on the default power-up channel along with the advertisement schedule information to the set-top box.

According to one embodiment herein, the RF modulator is configured to modulate the output of the media station on a default power-up channel frequency. The RF modulator further combines the plurality of television channels into a single communication means.

According to one embodiment herein, the set-top box receives the advertisements along with the scheduled information to be aired at respective time-slots as a first input and the television channel selected by the broadcasters from the media station as a second input.

According to one embodiment herein, the set-top box transparently transmits the selected television channel and/or the advertisements to the display terminal depending on the time slots scheduled by the scheduling module. The display terminal displays the selected television channel and/or the advertisements on the default power-up channel during the power up of the set-top-box.

According to one embodiment herein, the media station creates a proof of play archive comprising the advertisement played at the scheduled time along with date and time stamp. The proof of play archive is used for accountability purpose.

According to one embodiment herein, the system comprises a web-based monitoring application configured to access the proof of play archive from the media station. The application displays the proof of play archive to the advertisers. The advertisers access the archive using a security mechanism for the accountability purpose.

The various embodiments herein provide a method for customizing display of a plurality of advertisements on a display terminal through a television distribution network. The method comprising steps of:

receiving the plurality of advertisements from a plurality of advertisers that are to be aired during a power up of a set-top box;

scheduling a plurality of time slots by a scheduling module, for broadcasting the plurality of advertisements on a default power-up channel;

receiving the scheduling information from the scheduling module by a media grid;

transmitting the advertisements by a head-end through a media station on a default power-up channel, according to the scheduled time slots;

tuning the set top box to the default power-up channel on detection of the power-up of the set-top box; and displaying the advertisements on the display terminal according to the scheduled time slots.

According to one embodiment herein, the method further comprises scheduling of the advertisements is centralized for a plurality of media stations connecting to a scheduling module.

According to one embodiment herein, the method further comprises displaying the advertisements on the default power-up channel is in a continuous loop for the entire scheduled time slot.

According to one embodiment herein, the step of transmitting the advertisements by the head-end through the media station further comprises steps:

receiving a plurality of television channels from a broadcaster by the media station;

retrieving the advertisements according to the scheduling information received from the media grid;

modulating the advertisements by a RF modulator to a default power-up channel frequency; and transmitting the modulated power-up channel along with the plurality of television channels to the set-top box.

According to one embodiment herein, the method further comprises steps of reporting a proof of play archive to the advertisers for accountability purpose and calculating a number of viewers watching the advertisements aired on the default power-up channel.

According to one embodiment herein, a default power up channel or a preset channel selected by the user or service provider or broadcaster is displayed.

According to one embodiment herein, the unsold time slots in commercials are detected to broadcast a preset channel selected by a multi-service operator (MSO) or service provider.

According to one embodiment herein, the media station which is positioned at the head end receives two inputs. The first input comprises advertisement along with scheduling information and the second input comprises broad cast channel details. The media station outputs a respective advertisement for airing or telecast to display on a display screen or terminal when an unsold time slot is not detected or when all the time slots are sold. The media station detects an unsold time slot in the commercials to air or telecast a preset channel selected by the MSO or service provider.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Although the specific features of the embodiments herein are shown in some drawings and not in others. This is done for convenience only as each feature may be combined with any or all of the other features in accordance with the embodiments herein.

DETAILED DESCRIPTION OF THE INVENTION

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

Figure 1:
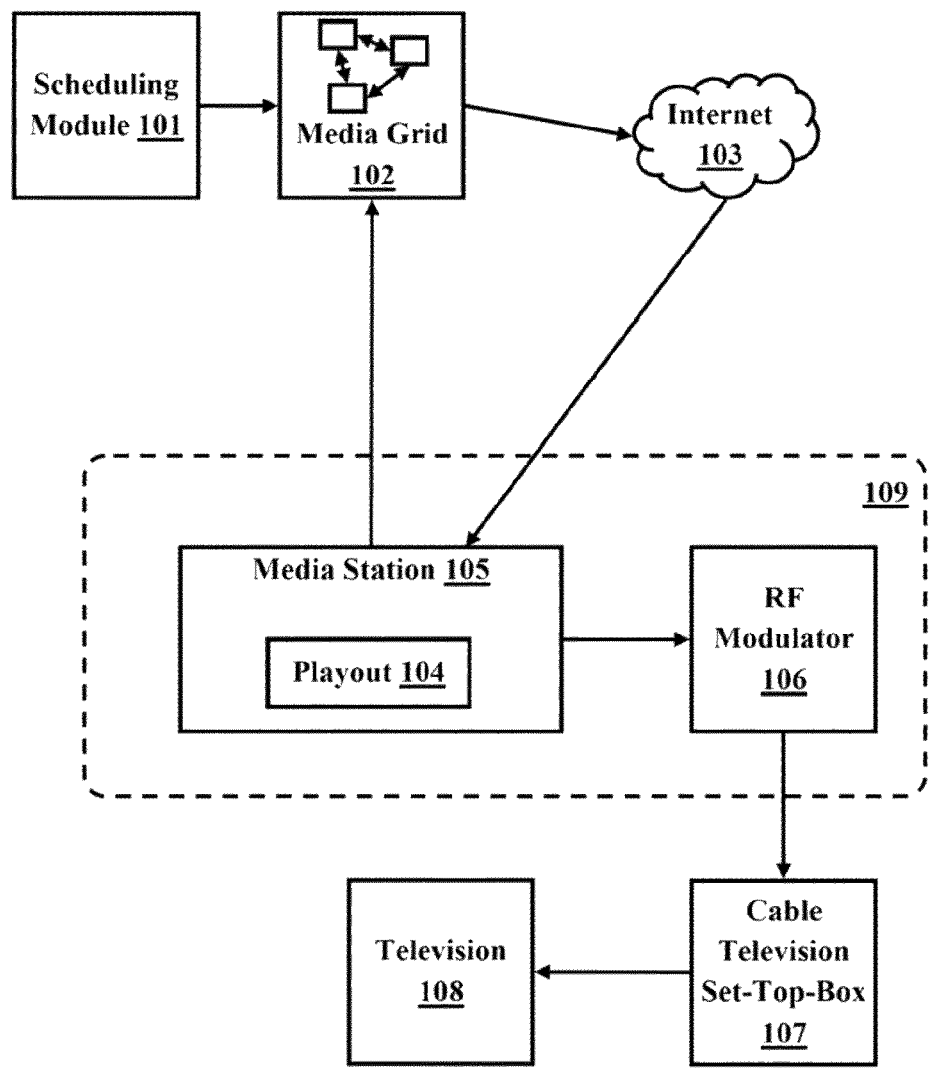
FIG. 1 is a block diagram illustrating a system for customizing a plurality of advertisements being displayed on a cable television system, according to one embodiment herein.

FIG. 1 is a block diagram illustrating a system for customizing a plurality of advertisements being displayed a television system, according to one embodiment herein. The system comprises a scheduling module 101 for scheduling the television commercials to be aired at respective time-slots during power up, a media grid 102 hosted on cloud, a media station 105 with a playout system 104 located at different cable head ends 109 for playing the television commercials scheduled for a particular time-slot in a continuous loop and output of the media station 105 is treated as the default power-up channel, a RF modulator 106 for modulating the output of the media station 105 on a default frequency which is then broadcasted from the cable head-ends 109 to all the households through a RF or optical cables via cable television set-top-box 107, an internet 103 for interconnecting various system components and a television 108 for playing broadcasted multimedia content.

According to one embodiment herein, the media station 105 located at different cable head ends 109 plays the television commercials scheduled for a particular time-slot in a continuous loop. So each time cable television set-top-box 107 is switched ON at the household through power on/off switch or through a remote control, the cable television set-top box 107 tunes to the default power up channel frequency and viewers in the household will watch the default power up channel until they switch to another channel through their remote control or the controls available on the television 108.

According to one embodiment herein, the scheduling module 101 comprises one or more scheduling teams for scheduling the television commercials/advertisements, trailers, promotions, and the like, to be aired at respective time-slots during power up of the Cable television set-top-box 107. The time-slots for each of the television commercials/advertisements, trailers, promotions, and the like are pre-programmed in the scheduling module 101.

According to one embodiment herein, the media grid 102 is hosted on a cloud. The media grid 102 comprises scheduling information of the television commercials/advertisements, trailers, promotions, and the like, to be aired at respective time-slots during power up.

According to one embodiment herein, the playout system 104 enables transmission of radio or television channels from the broadcaster into broadcast networks. These networks consists of terrestrial transmitters for analogue or digital radio and television, cable networks or satellites (intended for Cable television head-ends 109).

According to one embodiment herein, the Cable Television Set-Top-Box 107 receives modulated output of the media station 105, also known as power-up channel comprising television commercials as scheduled for airing at respective time-slots during power up from the media grid 102. The Cable Television Set-Top-Box 107 displays the power-up channel as received from the media station during power-up condition until any other channel is selected.

According to one embodiment herein, the system provides centralized scheduling of different advertisements at different time slots on a plurality of media stations 105 located at different cable television head-ends 109, so that default power up channel output of the media stations 105 now plays the selected advertisements in a loop during the entire time slot at different geographical locations. For example if an advertiser of a tooth paste has bought a 30 minute time slot between 5:00 and 5:30 hours on the power up channel and has two commercial advertisement of 30 second and 60 second durations, the power up channel will play both these advertisements in a continuous loop for the entire 30 minute time slot between 5:00 and 5:30 hours.

According to one embodiment herein, the media station 105 reports the proof of television commercial played within the said time-slot for accountability. The media station 105 creates a proof of play archive such as a video archive comprising an actual television commercial played at the scheduled time along with the date and time stamp.

According to one embodiment herein, the system further comprises a web based monitoring application which then accesses the reports and video archives from the media grid at each of the media stations and shows them to advertisers who are authorized to see these reports through a unique password or access mechanism provided to them. This provides a proof of play mechanism for accountability purpose.

According to one embodiment herein, the RF modulator 106 receives radio or television channels from the media station 105, combines the received radio or television channels with plurality of radio or television channels and inserts into the common cable. The plurality of radio or television channels are transmitted through a single cable with different frequencies to the cable television set-top-box 107.

According to one embodiment herein, the modulated radio or television channels receiving at the Cable television set-top-box 107 are de-modulated either by the Cable television set-top-box 107 or by the television 108 itself.

According to one embodiment herein, one or more television channel broadcasters are allowed to choose/select unsold, empty time-slots from the scheduling module 101 to air pre-set television channel at power up. The preset television channel is selected by the cable operator.

According to one embodiment herein, the system aggregates one or more broadcasting networks for airing television commercials. This provides centralized system where a particular television commercial is aired and the same is viewed in all the household televisions 108 connected with different broadcasting networks. This enables the said system to measure and verify power up advertisements in cable television for accountability.

According to one embodiment herein, the system detects the unsold time slots in commercials are detected to broadcast a preset channel selected by a multi-service operator (MSO) or service provider.

According to one embodiment herein, the media station which is positioned at the head end receives two inputs. The first input comprises advertisement along with scheduling information and the second input comprises broad cast channel details. The media station outputs a respective advertisement for airing or telecast to display on a display screen or terminal when an unsold time slot is not detected or when all the time slots are sold. The media station detects an unsold time slot in the commercials to air or telecast a preset channel selected by the MSO or service provider.

Figure 2:
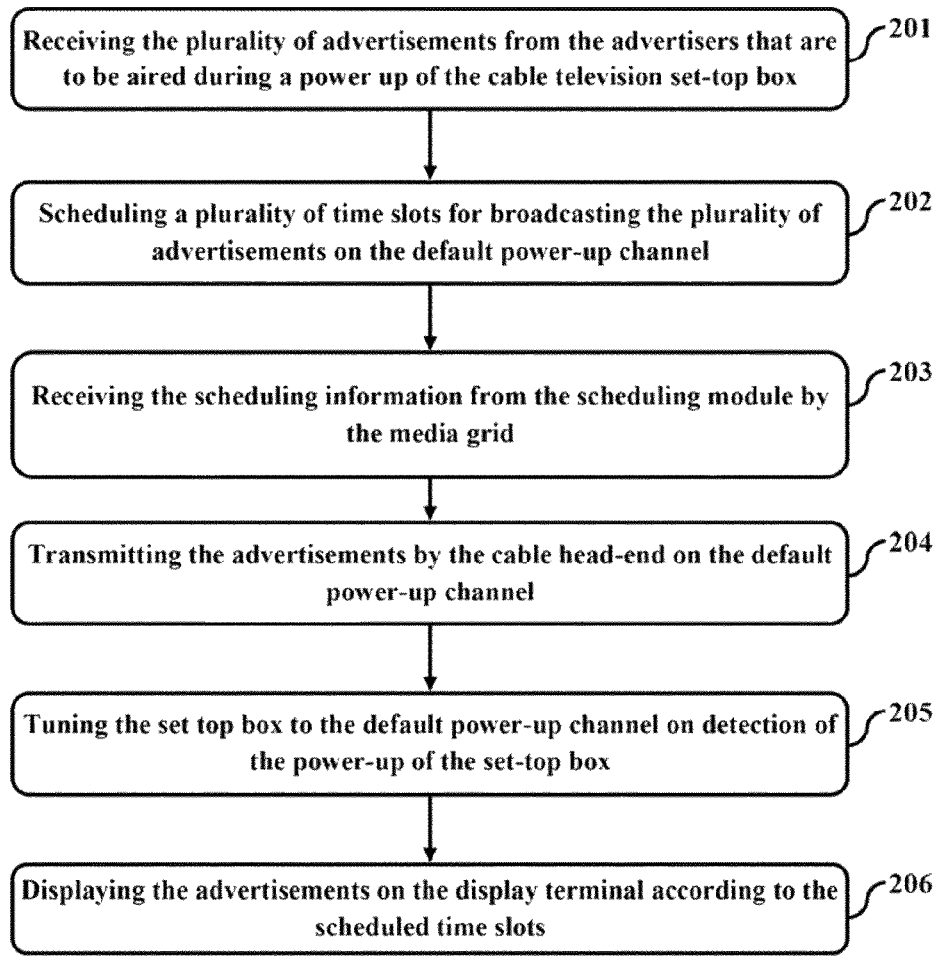
FIG. 2 is a flowchart illustrating a method for customizing the plurality of advertisements being displayed on the cable television system, according to one embodiment herein.

FIG. 2 is a flowchart illustrating a method for customizing the plurality of advertisements being displayed on the cable television system, according to one embodiment herein. The method comprising the steps of: receiving the plurality of advertisements from the plurality of advertisers that are to be aired during a power up of the cable television set-top box (Step 201), scheduling a plurality of time slots by the scheduling module, for broadcasting the plurality of advertisements on a power-up channel (Step 202), receiving the scheduling information from the scheduling module by the media grid (Step 203), transmitting the advertisements by the cable head-end through the media station on the power-up channel, according to the scheduled time slots (Step 204), tuning the set top box to the power-up channel on detection of the power-up of the set-top box (Step 205), and displaying the advertisements on the display terminal according to the scheduled time slots (Step 206).

According to one embodiment herein, the method and system enables market-wise customization of power up advertisements in cable television. The system and method allows advertiser to promote or showcase television commercials with respect to a particular market or geographical location/region or state/province. For example: The system and method of the embodiments herein allows advertisers/brand owners/product supplier to promote or showcase television commercials in regional language mostly spoken in a particular market or geographical location/region or state/province; region specific commercials, etc.

According to one embodiment herein, the method and system enables to schedule the contents and advertisements to be played out as the power-up channels through media stations located in a plurality of head-ends each of which can be servicing different set of households in different geographic areas. For example, power up channel in city of Mumbai could be playing a tooth paste advertisement during 5:00 to 5:30 hours and the power up channel in city of Delhi could be playing the advertisements of a motor-cycle during 5:00 and 5:30 hours. Both these advertisements are scheduled centrally through the cloud hosted media grid to which each of the media stations is connected.

According to one embodiment herein, the method and system provides a measurement of the number of viewers who could have watched the advertisements aired in the power up channel in different geographies. The method and system calculates a number of viewers turning on the set-top box at a particular time. Further, the method finds the difference in the number of viewers at every minute with respect to the last minute to indicate the number of households who could have potentially turned on their set-top box and hence are likely to have seen the advertisements aired during a particular time slot in the power up channel within a specific market reported by the television audience measurement systems. In case, where the power up channel is playing in only a fraction of the households and an approximate estimate of the number of households is known, the number of viewers estimated to have watched the power up channel is suitably scaled down to provide a more accurate estimate.

According to one embodiment herein, the unsold time slots in commercials are detected to broadcast a preset channel selected by a multi-service operator (MSO) or service provider.

According to one embodiment herein, the media station which is positioned at the head end receives two inputs. The first input comprises advertisement along with scheduling information and the second input comprises broad cast channel details. The media station outputs a respective advertisement for airing or telecast to display on a display screen or terminal when an unsold time slot is not detected or when all the time slots are sold. The media station detects an unsold time slot in the commercials to air or telecast a preset channel selected by the MSO or service provider.

Figure 3:
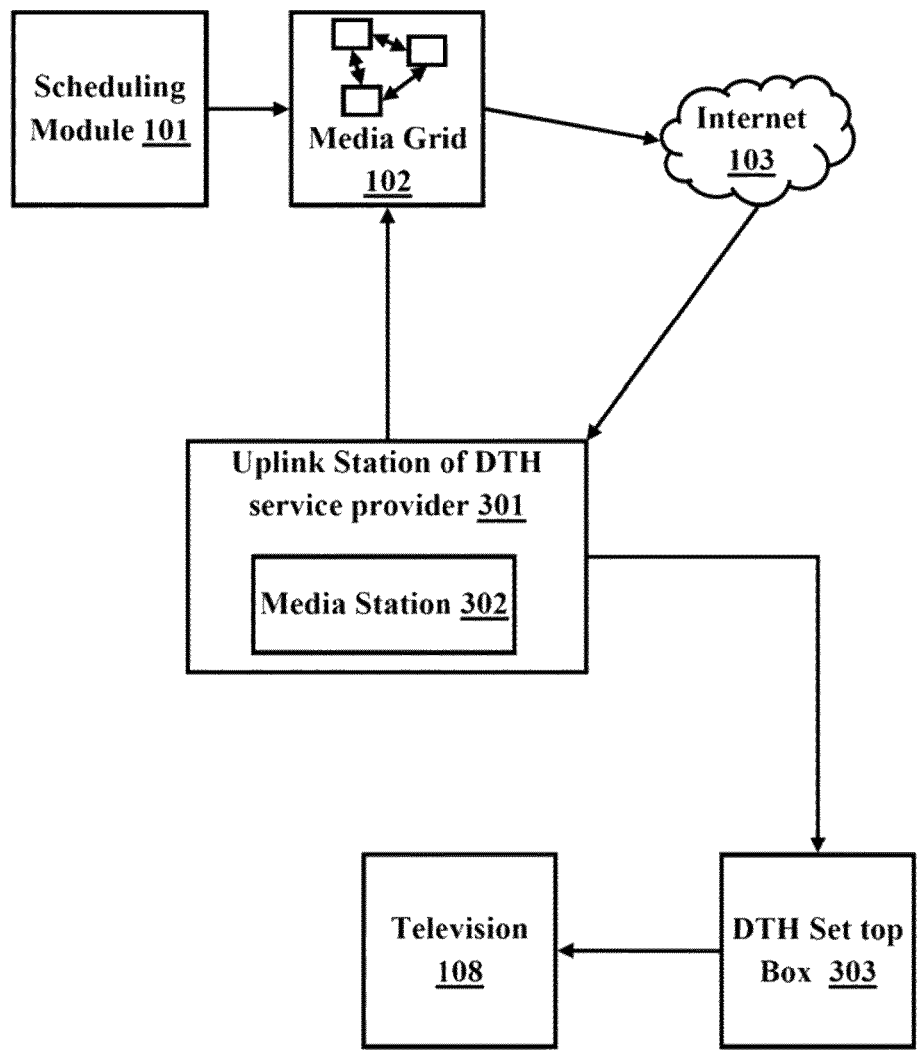
FIG. 3 is a block diagram illustrating a system for customizing the plurality of advertisements being displayed on a satellite DTH television system, according to one embodiment herein.

FIG. 3 is a block diagram illustrating a system for customizing the plurality of advertisements being displayed on a satellite DTH television system, according to one embodiment herein. The system comprises a scheduling module 101 for scheduling the television commercials to be aired at respective time-slots during power up for different DTH set-top boxes of different service providers (such as Tata Sky, Big TV, Sun Direct. etc), a media grid 102 hosted on cloud comprising scheduling information of the television commercials/advertisements, trailers, promotions, etc. to be aired at respective time-slots during power up of the DTH set-top-box 303 of different service providers, a media station 302 located at each of the up-link stations of DTH service providers 301 for playing the television commercials scheduled for a particular time-slot in a continuous loop, an internet 103 for interconnecting various system components and a television 108 for playing broadcasted multimedia content.

According to one embodiment herein, the media station located at each of the up-link stations of DTH service providers 301 plays the television commercials scheduled for a particular time-slot in a continuous loop. So each time DTH set-top-box 303 of a particular service provider is switched on at the household through power on/off switch or through a remote control, the DTH set-top box 303 tunes to the default power up channel frequency and viewers in the household will watch the default power up channel until they switch to another channel through their remote control or the controls available on the television 108.

According to one embodiment herein, the scheduling module 101 comprises one or more scheduling teams for scheduling the television commercials/advertisements, trailers, promotions, and the like, to be aired at respective time-slots during power up of the DTI-H set-top-box 303. The time-slots for each of the television commercials/advertisements, trailers, promotions, and the like, are preprogrammed in the scheduling module 101.

According to one embodiment herein, the DTH Set-Top-Box 303 transparently transmits radio or television channels from the broadcaster to the television 108 all the time except during the power up of the DTH set-top-box 303. The DTH set-top-box 303 airs the television commercials/advertisements, trailers, promotions, and the like at respective time-slots during the power up of the set-top box.

According to one embodiment herein, the system provides centralized scheduling of different advertisements at different time slots on a plurality of up-link stations of different service providers 301. For example if an advertiser of a tooth paste has bought a 30 minute time slot between 5:00 and 5:30 hours on the power up channel of the Tata sky set-top box service provider and has two commercial advertisement of 30 second and 60 second durations, the power up channel of the Tata sky set-top box will play both these advertisements in a continuous loop for the entire 30 minute time slot between 5:00 and 5:30 hours. Similarly, if an advertiser of a Volkswagen car maker has bought a 30 minute time slot between 5:00 and 5:30 hours on the power up channel of the Big TV set-top box service provider and has two commercial advertisement of 60 second and 40 second durations, the power up channel of the Big TV set-top box will play both these advertisements in a continuous loop for the entire 30 minute time slot between 5:00 and 5:30 hours.

According to one embodiment herein, the media station 302 reports the proof of television commercial played within the said time-slot for accountability. The media station 302 creates a proof of play archive such as a video archive comprising an actual television commercial played at the scheduled time along with the date and time stamp.

According to one embodiment herein, one or more television channel broadcasters are allowed to choose/select empty time-slots from the scheduling module 101 to air pre-set television channel at power up.

According to one embodiment herein, the system aggregates one or more broadcasting networks for airing television commercials. This provides centralized system where a particular television commercial is aired and the same is viewed in all the household televisions 108 connected with different broadcasting networks. This enables the said system to measure and verify power up advertisements in satellite or DTH television for accountability.

According to one embodiment herein, the output displayed on the display terminal is selected depending on the time slots allocated by the scheduling module, wherein the advertisements or the television channel selected by the broadcasters is displayed on the display terminal during the power-up of the set-top box.

According to one embodiment herein, the unsold time slots in commercials are detected to broadcast a preset channel selected by a multi-service operator (MSO) or service provider.

According to one embodiment herein, the media station which is positioned at the head end receives two inputs. The first input comprises advertisement along with scheduling information and the second input comprises broad cast channel details. The media station outputs a respective advertisement for airing or telecast to display on a display screen or terminal when an unsold time slot is not detected or when all the time slots are sold. The media station detects an unsold time slot in the commercials to air or telecast a preset channel selected by the MSO or service provider.

Figure 4:
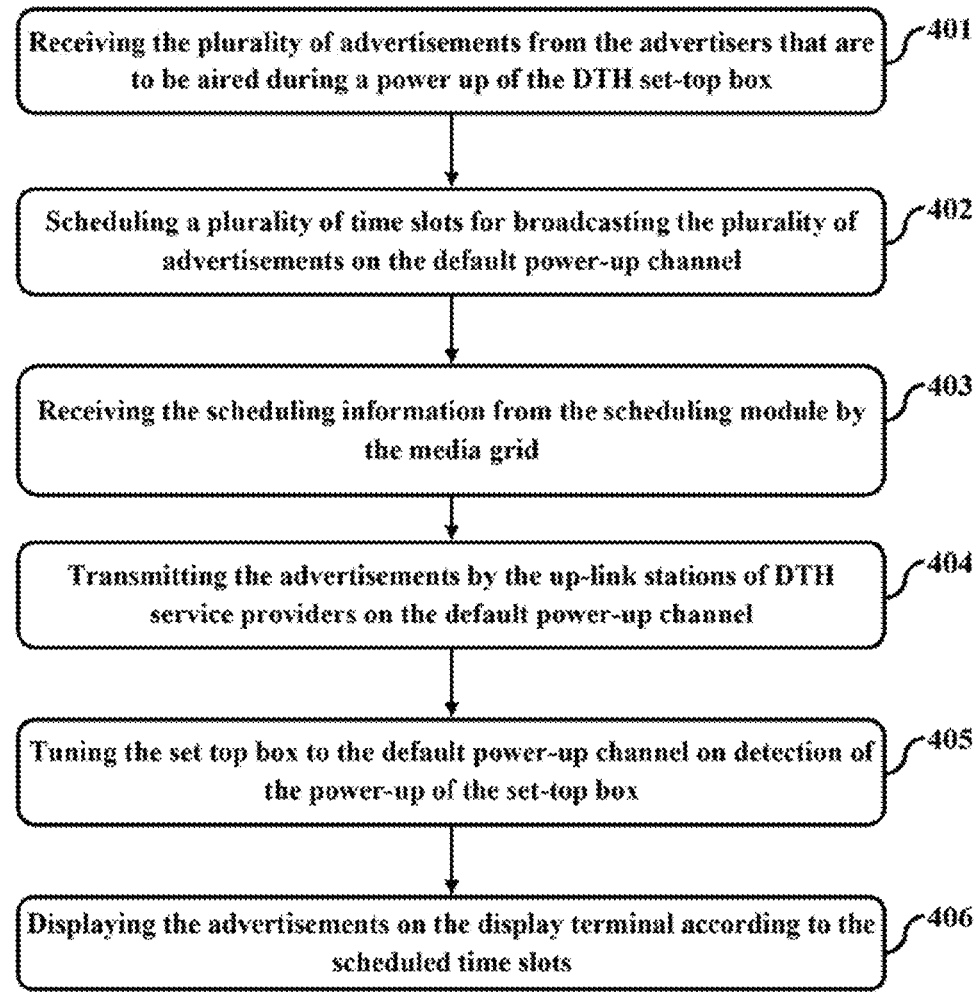
FIG. 4 is a flowchart illustrating a method for customising the plurality of advertisements being displayed on the satellite DTH television system, according to one embodiment herein.

FIG. 4 is a flowchart illustrating a method for customising the plurality of advertisements being displayed on the satellite DTH television system, according to one embodiment herein. The method comprises the steps of receiving the plurality of advertisements from the plurality of advertisers that are to be aired during a power up of the DTH set-top box (Step 401), scheduling a plurality of time slots by the scheduling module, for broadcasting the plurality of advertisements on power-up channel (Step 402), receiving the scheduling information from the scheduling module by the media grid (Step 403), transmitting the advertisements by the up-link stations of plurality of DTH service providers on a default power-up channel, according to the scheduled time slots (Step 404), tuning the set top box to the default power-up channel on detection of the power-up of the set-top box (Step 405), and displaying the advertisements on the display terminal according to the scheduled time slots (Step 406).

According to one embodiment herein, the unsold time slots in commercials are detected to broadcast a preset channel selected by a multi-service operator (MSO) or service provider.

According to one embodiment herein, the media station which is positioned at the head end receives two inputs. The first input comprises advertisement along with scheduling information and the second input comprises broad cast channel details. The media station outputs a respective advertisement for airing or telecast to display on a display screen or terminal when an unsold time slot is not detected or when all the time slots are sold. The media station detects an unsold time slot in the commercials to air or telecast a preset channel selected by the MSO or service provider.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A system comprising a hardware processor and a memory for customizing display of a plurality of advertisements on a display terminal through a television distribution network, wherein the system comprising:
    a scheduling module run on the hardware processor and configured to schedule a plurality of time slots for airing the advertisements on a default or preset power-up channel, and wherein the scheduling module is configured for scheduling a plurality of television commercials to be aired at respective time slots during power-up for a plurality of mutually different DTH set top boxes of a plurality of mutually different service providers, and wherein the scheduling module is configured to perform a centralized scheduling of a plurality of mutually different advertisements at a plurality of mutually different time slots on a plurality of link stations of the plurality of mutually different service providers;
    a media grid module hosted on the cloud, in communication with the scheduling module, and configured to store scheduling information of the advertisements which need to be aired at the respective time slots allocated by the scheduling module;
    a head-end module in communication with the media grid, and
    configured to broadcast the advertisements scheduled for a particular time slot onto a default or a preset power-up channel, and wherein a media station is provided in the head-end and the media station is configured to detect an empty time slot, wherein the head-end further comprises a media station with a playout module and a Radio Frequency (RF) modulator, and wherein the RF modulator is configure to modulate the output of the media station on a default power-up channel frequency, wherein the RF modulator further combines the plurality of television channels into a single communication means; and a set-top box in communication with the head-end, and configured to display the default or preset power-up channel on the display device during a power-up of the set-top box;

wherein an internet connectivity is provided for enabling communication between the media grid and the media station and wherein a wired or wireless communication means is utilized for communicating the advertisement content from the head-end to the plurality of display terminals via a set-top box, and wherein the default or preset power-up channel is configured to play the scheduled advertisements in a continuous loop during the entire time slot bought by an advertiser, and wherein the set-top box is configured to receive the advertisements along with the scheduled information to be aired at respective time slots as a first input and the modulated television channel selected by the broadcasters from the media station as a second input, and wherein the set-top box is configured to transparently transmit the selected channel and/or the advertisements to the display terminal depending on the time slots scheduled by the scheduling module, and wherein the display terminal is configured to display the selected television channel and/or the advertisements on the default power-up channel during the power up of the set-top-box, and wherein the system is configured to aggregate the plurality of broadcasting networks for airing television commercials to provide a centralized system to air a particular television commercial for viewing the same in all the household televisions connected with the plurality of broadcasting networks to measure and verify power up advertisements in satellite or DTH television.

2. The system according to claim 1, wherein the time-slots for displaying the advertisements are pre-programmed by the scheduling module.

3. The system according to claim 1, wherein the scheduling module provides a centralized scheduling of the advertisements for a plurality of media stations communicating with the scheduling module.

4. The system according to claim 1, wherein the broadcasters are allowed to choose the empty time slots allocated by the scheduling module for broadcasting a respective or preset channel during the power up of the set-top box.

5. The system according to claim 1, wherein a plurality of the media stations is configured to transmit a respective or preset television channels from a broadcaster to the set-top box, wherein the playout module built within the media station is further configured to transmit the advertisements on the default or preset power-channel as scheduled by the scheduling module to the set-top box.

6. The system according to claim 1, wherein the media station creates a proof of play archive comprising the advertisement played at the scheduled time along with date and time stamp, wherein the proof of play archive is used for accountability purpose.

7. The system according to claim 1, further comprises a monitoring application run on the hardware processor and configured to access a proof of play archive from the media station, wherein the application is configured to display the proof of play archive to an advertiser, wherein the advertiser is enabled to access the proof of play archive using a security mechanism for an accountability.

8. A computer implemented method comprising instructions stored on a non-transitory computer readable storage medium and run on a computing system comprising hardware processor for customizing display of a plurality of advertisements on a display terminal through a television distribution network, wherein the method comprising steps of:

receiving the plurality of advertisements from a plurality of advertisers that are to be aired during a power up of a set-top box;

scheduling a plurality of time slots by a scheduling module, for broadcasting the plurality of advertisements on a default or preset power up channel, and wherein scheduling of the advertisements is centralized for a plurality of media stations connecting to a scheduling module;

receiving the scheduling information from the scheduling module by a media grid;

detecting an unsold time slot in commercials by a media station for airing or telecasting a preset channel selected by MSO or service provider;

transmitting the advertisements by a head-end through a media station on a default or preset power-up channel, according to the schedule time slots;

modulating an output of the media station to a default power-up channel frequency through an RF modulator;

combining the plurality of television channels into a single communication means through the RF modulator;

tuning the set top box to the default or preset power-up channel on detection of the power-up of the set-top box; and displaying the advertisements on the display terminal according to the scheduled time slots, and wherein the advertisements are displayed on the default or preset power-up channel in a continuous loop for the entire scheduled time slot bought by an advertiser;

wherein the scheduling module is configured for scheduling a plurality of television commercials to be aired at respective time slots during power-up for a plurality of mutually different DTH set top boxes of a plurality of mutually different service providers, and wherein the scheduling module is configured to perform a centralized scheduling of a plurality of mutually different advertisements at a plurality of mutually different time slots on a plurality of link stations of the plurality of mutually different service providers, and wherein the set-top box is configured to receive the advertisements along with the scheduled information to be aired at respective time slots as a first input and the modulated television channel selected by the broadcasters from the media station as a second input, and wherein the set-top box is configured to transparently transmit the selected channel and/or the advertisements to the display terminal depending on the time slots scheduled by the scheduling module, wherein the display terminal is configured to display the selected television channel and/or the advertisements on the default power-up channel during the power up of the set-top-box, and wherein the system is configured to aggregate the plurality of broadcasting networks for airing television commercials to provide a centralized system to air a particular television commercial for viewing the same in all the household televisions connected with the plurality of broadcasting networks to measure and verify power up advertisements in satellite or DTH television.

9. The method according to claim 8, wherein transmitting the advertisements by the head-end through the media station further comprises steps of:
- receiving a plurality of television channels from a broadcaster by the media station;
- retrieving the advertisements according to the scheduling information received from the media grid;
- transmitting the modulated power-up channel along with the plurality of television channels to the set-top box.

10. The method according to claim 8, further comprises steps of reporting a proof of play archive to the advertisers for accountability purpose and calculating a number of viewers watching the advertisements aired on the default or preset power-up channel.

11. The method according to claim 8, further comprises steps of detecting or computing number of viewers watching a channel every minute and comparing the computed number viewers for a channel at a given minute with the computed number of viewers watching a channel at a penultimate minute or a minute earlier by one minute to the given minute to detect a number of viewers powered on at a given minute.

* * * * *